US009335572B2

(12) United States Patent
Kasano et al.

(10) Patent No.: US 9,335,572 B2
(45) Date of Patent: May 10, 2016

(54) IMAGE DISPLAY APPARATUS

(71) Applicant: PANASONIC CORPORATION, Osaka (JP)

(72) Inventors: Masahiro Kasano, Osaka (JP); Kouki Ichihashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 548 days.

(21) Appl. No.: 13/683,773

(22) Filed: Nov. 21, 2012

(65) Prior Publication Data
US 2013/0135452 A1 May 30, 2013

(30) Foreign Application Priority Data

Nov. 25, 2011 (JP) ................................ 2011-257981

(51) Int. Cl.
*G02F 1/133* (2006.01)
*H04N 13/04* (2006.01)
*G02B 27/22* (2006.01)
*G02B 27/00* (2006.01)
*G02F 1/13* (2006.01)
*F21V 8/00* (2006.01)
*G02F 1/1333* (2006.01)
*G02F 1/1335* (2006.01)
*G02F 1/29* (2006.01)

(52) U.S. Cl.
CPC .......... *G02F 1/13306* (2013.01); *G02B 6/0053* (2013.01); *G02B 27/0093* (2013.01); *G02B 27/2264* (2013.01); *G02F 1/1323* (2013.01); *H04N 13/04* (2013.01); *H04N 13/0404* (2013.01); *H04N 13/0418* (2013.01); *H04N 13/0452* (2013.01); *H04N 13/0484* (2013.01); *G02F 1/1333* (2013.01); *G02F 1/133526* (2013.01); *G02F 2001/291* (2013.01)

(58) Field of Classification Search
CPC . H04N 13/004; H04N 13/04; H04N 13/0418; H04N 13/0452; H04N 13/0484; G02F 1/13306; G02F 27/2264; G02F 27/0093; G02F 1/1323; G02B 6/0053; G02F 1/1333; G02F 1/133526; G02F 2001/291
See application file for complete search history.

(56) References Cited

U.S. PATENT DOCUMENTS 6,469,683 B1 10/2002 Suyama et al.
8,760,592 B2 * 6/2014 Toko ............................... 349/13
(Continued)

FOREIGN PATENT DOCUMENTS

JP 61-086730 A 5/1986
JP 07-098439 A 4/1995
(Continued)

*Primary Examiner* — Laura Tso
(74) *Attorney, Agent, or Firm* — McDermott Will & Emery LLP

(57) ABSTRACT

A liquid crystal prism element includes a pair of opposing substrates, a plurality of triangular prisms which have a ridge line extending in a Y axis direction and are arranged between the opposing substrates so as to be aligned along an X axis direction, and a liquid crystal layer formed between the opposing substrates. Each triangular prism has an inclined surface located on a center side of the opposing substrate in the X axis direction, an inclined surface located on a lateral side of the opposing substrate in the X axis direction, and a bottom surface. Both of the two inclined surfaces of a triangular prism provided at least in a portion of a region on the opposing substrate are formed so as to not be perpendicular to the opposing substrate.

5 Claims, 5 Drawing Sheets

(56) References Cited

U.S. PATENT DOCUMENTS

| | | | |
|---|---|---|---|
| 2006/0227283 A1* | 10/2006 | Ooi et al. | 349/201 |
| 2007/0182915 A1* | 8/2007 | Osawa | G02B 3/08 349/201 |
| 2009/0140962 A1* | 6/2009 | Hwang | G02B 6/0038 345/87 |
| 2009/0161364 A1* | 6/2009 | Bremerich et al. | 362/268 |
| 2009/0237576 A1 | 9/2009 | Nelson et al. | |
| 2010/0157026 A1* | 6/2010 | Reichelt | 348/51 |
| 2010/0157399 A1* | 6/2010 | Kroll et al. | 359/11 |
| 2010/0194854 A1* | 8/2010 | Kroll et al. | 348/40 |
| 2010/0214634 A1* | 8/2010 | Kroll et al. | 359/9 |
| 2010/0232015 A1* | 9/2010 | Nelson | G02B 3/08 359/463 |

FOREIGN PATENT DOCUMENTS

| | | |
|---|---|---|
| JP | 09-297282 A | 11/1997 |
| JP | 11-234705 A | 8/1999 |
| JP | 2010-529485 A | 8/2010 |
| JP | 2010-243941 A | 10/2010 |
| JP | 2011-519052 A | 6/2011 |

* cited by examiner

LIQUID CRYSTAL PRISM AT SCREEN EDGE

LIQUID CRYSTAL PRISM AT SCREEN EDGE

IMAGE DISPLAY APPARATUS

CROSS REFERENCE TO RELATED APPLICATION

The disclosure of Japanese Patent Application No. 2011-257981, filed on Nov. 25, 2011, is incorporated herein by reference.

BACKGROUND

1. Field

The present disclosure relates to an image display apparatus for displaying an image, such as a liquid crystal display.

2. Description of the Related Art

Japanese Laid-Open Patent Publication No. 2010-529485 discloses an automatic stereoscopic display that causes images to be stereoscopically viewed by alternately providing light of an image for right eye and light of an image for left eye to the eyes of multiple observers, respectively. In the apparatus disclosed in Japanese Laid-Open Patent Publication (translation of PCT application) No. 2010-529485, the optical refraction behavior by a deflection means is changed so as to follow the eye positions of the observers. The deflection means is composed of electrowetting cells containing two types of immiscible liquids. When a voltage is applied to the electrowetting cells, the interface between the liquids is changed, whereby a prism function is realized by the electrowetting cells.

SUMMARY

The present disclosure provides an image display apparatus including a liquid crystal prism that is optimally designed for light whose incident angle changes according to a position on a screen.

An image display apparatus according to the present disclosure includes: an image display panel; a backlight device located on a back surface side of the image display panel; a liquid crystal prism element located between the image display panel and the backlight device and configured to change a deflection direction of emitted light according to a voltage applied thereto; a position detection section configured to detect a position of a user; and a control section configured to control the voltage applied to the liquid crystal prism element, on the basis of information of the position of the user detected by the position detection section. The liquid crystal prism element includes a pair of opposing substrates, a plurality of triangular prisms which have a ridge line extending in a first direction parallel to one side of the image display panel and are arranged between the pair of opposing substrates so as to be aligned in a second direction orthogonal to the first direction, and a liquid crystal sealed between the opposing substrates. Each triangular prism has a first inclined surface located on a center side of the opposing substrate in the second direction, a second inclined surface located on a lateral side of the opposing substrate in the second direction, and a bottom surface. Both the first inclined surface and the second inclined surface of a triangular prism provided at least in a certain portion of a region on the opposing substrate are not perpendicular to the opposing substrate.

In the display apparatus according to the present disclosure, a triangular prism having two inclined surfaces which are not perpendicular to the opposing substrate can be located according to a position in the liquid crystal prism. Therefore, according to the present disclosure, an image display apparatus including a liquid crystal prism that is optimally designed to change a deflection angle of light so as to follow the position of an observer can be configured.

DETAILED DESCRIPTION

Hereinafter, an embodiment will be described in detail with appropriate reference to the drawings. It is noted that a more detailed description than need may be omitted. For example, the detailed description of already well-known matters and the overlap description of substantially same configurations may be omitted. This is to avoid an unnecessarily redundant description below and to facilitate understanding of a person skilled in the art.

It is noted that the inventors provide the accompanying drawings and the following description in order a person skilled in art to fully understand the present disclosure, and do not intend to limit the subject matter defined by the claims.

<1. Configuration of Image Display Apparatus>

Figure 1A:
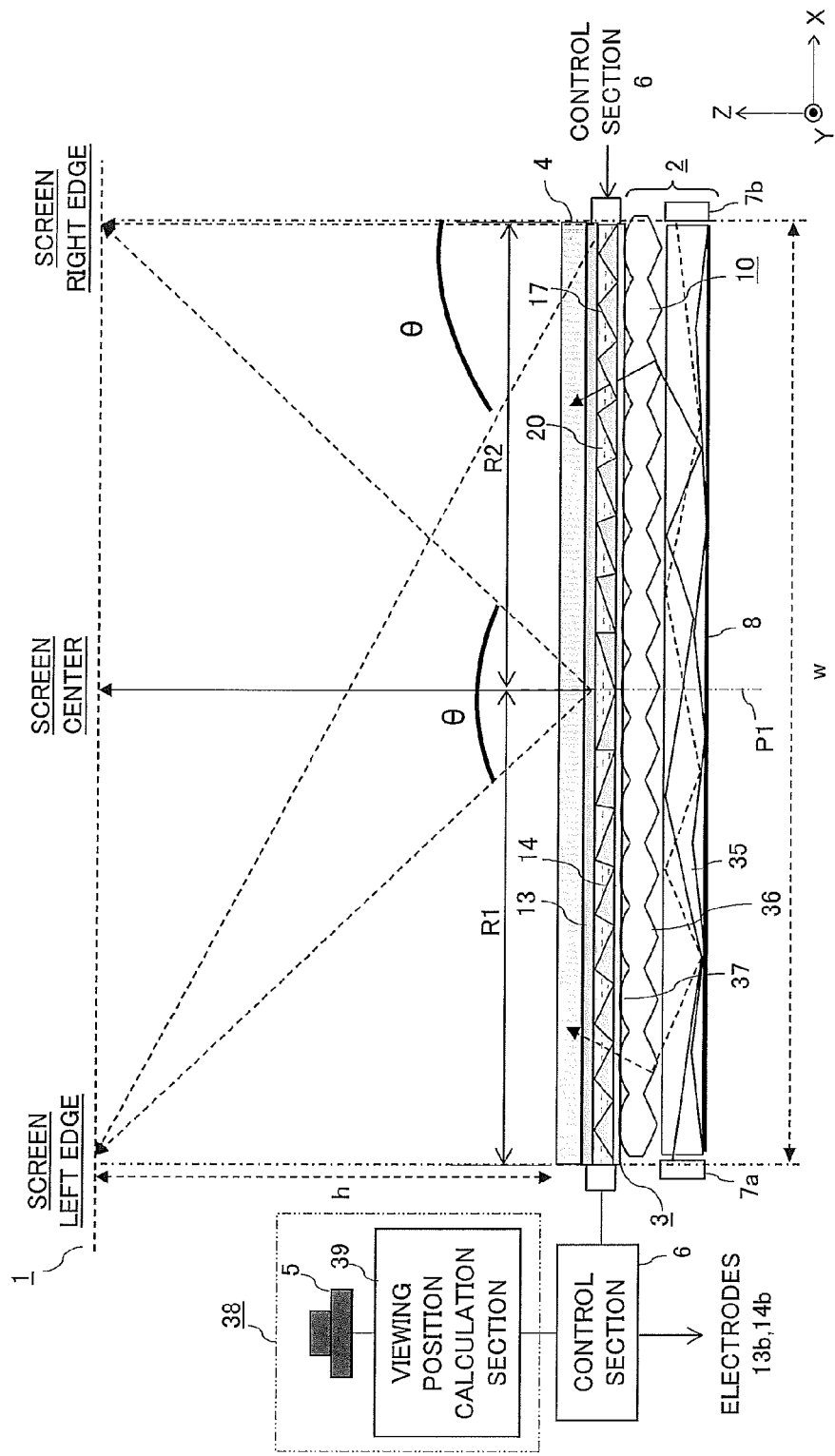
FIG. 1A is a schematic configuration diagram of an image display apparatus according to an embodiment.
Figure 1B:
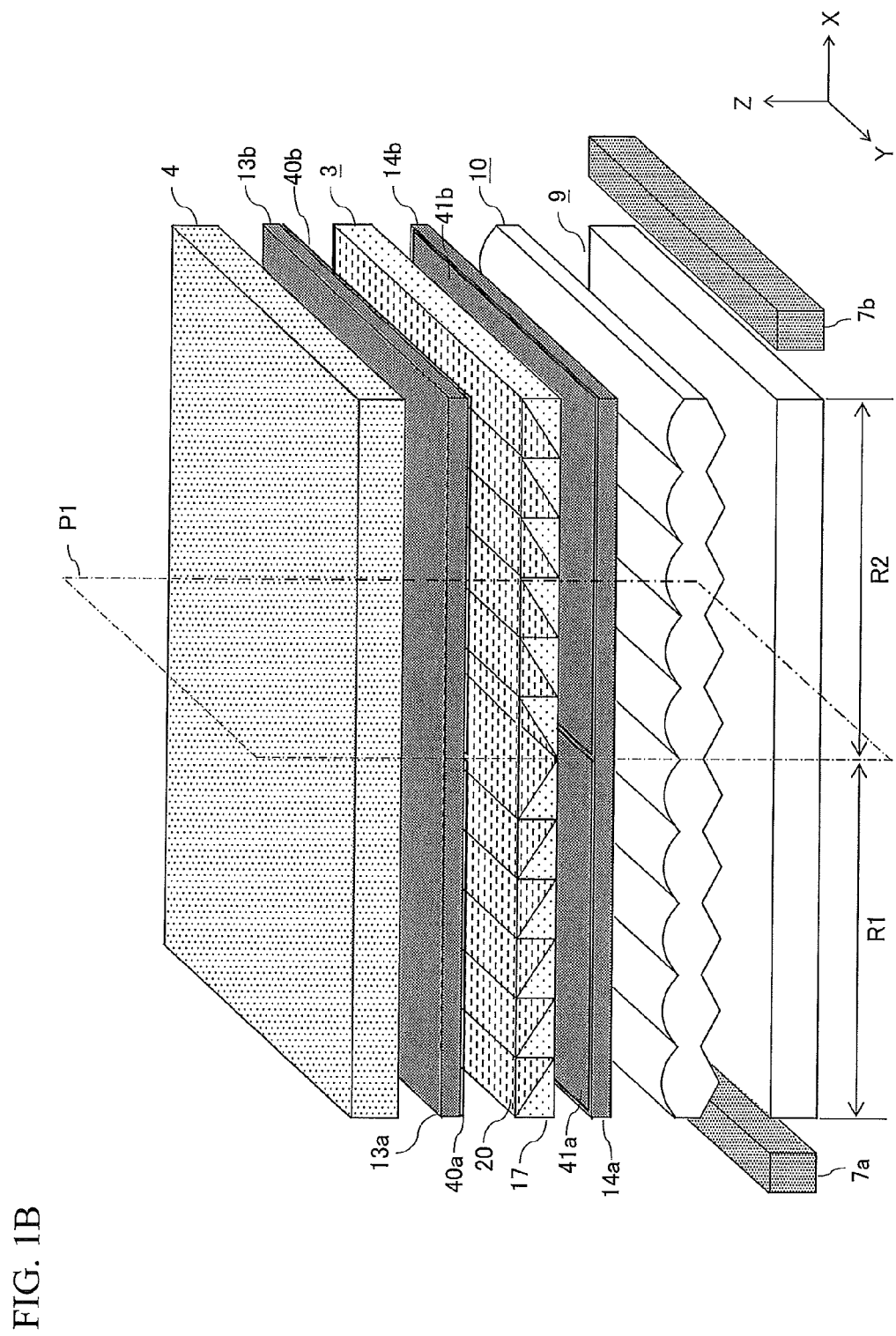
FIG. 1B is an exploded perspective view of a part of the image display apparatus shown in FIG. 1A.

FIG. 1A is a schematic cross-sectional view of an image display apparatus 1 according to the embodiment, and FIG. 1B is an exploded perspective view of a part of the image display apparatus 1 shown in FIG. 1A. It is noted that in FIG. 1A, illustration of electrodes 40a, 40b, 41a, and 41b shown in FIG. 1B is omitted.

In the present embodiment, a three-dimensional orthogonal coordinate system is set for the image display apparatus 1, and a direction is specified by using the coordinate axes. As shown in FIGS. 1A and 1B, an X axis direction coincides with a right-left direction (horizontal direction) when a user faces a display surface of an image display panel 4. A Y axis direction coincides with an up-down direction when the user faces the display surface of the image display panel 4. A Z axis direction coincides with a direction perpendicular to the display surface of the image display panel 4. Here, "facing" means that the user is located directly in front of the display surface such that, for example, when a letter of "A" is displayed on the display surface, the user sees the letter of "A" from a correct direction. In addition, FIGS. 1A and 1B correspond to views as seen from above the image display apparatus 1. Thus, the left side in FIGS. 1A and 1B corresponds to the right side of the display screen when the display screen is seen from a viewer.

The image display apparatus 1 includes a light source switching type backlight 2, a liquid crystal prism element 3, the image display panel 4 which displays an image for a right eye and an image for left eye while alternately switching between the image for right eye and the image for left eye, a position detection section 38 which detects the position of a user who uses the image display apparatus 1, and a control section 6 which controls a liquid crystal driving voltage outputted to the liquid crystal prism element 3, on the basis of information of the detected position of the user. Hereinafter, each component will be described in detail.

The backlight 2 includes light sources 7a and 7b facing each other, a reflection film 8, a light guide plate 9, and a light control film 10. The reflection film 8 is provided on a lower surface side of the light guide plate 9, and the light control film 10 is provided on an upper surface side of the light guide plate 9.

The light sources 7a and 7b are arranged so as to extend along a pair of side surfaces, respectively, of the light guide plate 9, and face each other in the X axis direction. The light source 7a is located at the left side surface of the light guide plate 9, and the light source 7b is located at the right side surface of the light guide plate 9. Each of the light sources 7a and 7b has a plurality of LED elements arranged in the Y axis direction. Each of the light sources 7a and 7b alternately repeats lighting-up and going-out in synchronization with switching between the image for right eye and the eye image for left eye which are displayed on the image display panel 4. In other words, when the image display panel 4 displays the image for right eye, the light source 7a lights up and the light source 7b goes out, and when the image display panel 4 displays the image for left eye, the light source 7a goes out and the light source 7b lights up.

Light emitted from the light sources 7a and 7b spreads within the light guide plate 9 while being repeatedly totally reflected at the upper surface and the lower surface of the light guide plate 9. Light having an angle exceeding the total reflection angle within the light guide plate 9 is emitted from the upper surface of the light guide plate 9. The lower surface of the light guide plate 9 is composed of a plurality of inclined surfaces 35 as shown in FIGS. 1A and 1B. By these inclined surfaces 35, light propagating within the light guide plate 9 is reflected in various directions, and thus the intensity of the light emitted from the light guide plate 9 becomes uniform across the entire upper surface.

The reflection film 8 is provided on the lower surface side of the light guide plate 9. Light having an angle exceeding the total reflection angles of the inclined surfaces 35 provided in the lower surface of the light guide plate 9 is reflected by the reflection film 8, enters the light guide plate 9 again, and is eventually emitted from the upper surface. The light emitted from the light guide plate 9 is incident on the light control film 10.

On a lower surface of the light control film 10, a plurality of prisms 36 each having a triangular cross section and a ridge line extending in the Y axis direction are aligned along the X axis direction. In other words, on the lower surface of the light control film 10, the prisms 36 each having a triangular cross section are arranged in a one-dimensional array. In addition, on an upper surface of the light control film 10, a plurality of cylindrical lenses 37 extending in the Y axis direction are aligned in the X axis direction. In other words, a lenticular lens is formed on the upper surface of the light control film 10.

The light incident on the lower surface of the light control film 10 is refracted toward the Z axis direction by the prisms 36, converged by the lenticular lens located on the upper surface, and is incident on the liquid crystal prism element 3.

Figure 1C:
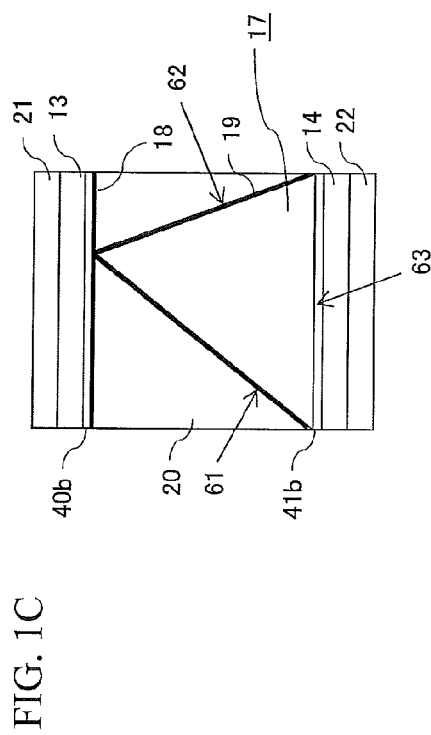
FIG. 1C is a partially enlarged view of a liquid crystal prism element shown in FIG. 1A.

FIG. 1C is a partially enlarged view of the liquid crystal prism element 3 shown in FIG. 1A. Hereinafter, the liquid crystal prism element 3 will be described in detail with reference to FIGS. 1A to 1C.

The liquid crystal prism element 3 controls a deflection direction such that the light that is emitted from the left-side light source 7a and incident thereon through the light guide plate 9 and the light control film 10 is converged at the position of the right eye of the user. In addition, the liquid crystal prism element 3 controls a deflection direction such that the light that is emitted from the right-side light source 7b and incident thereon through the light guide plate 9 and the light control film 10 is converged at the position of the left eye of the user.

More specifically, the liquid crystal prism element 3 includes a pair of opposing substrates 13 and 14, a plurality of prisms 17 and a liquid crystal layer 20 sealed between the opposing substrates 13 and 14, the electrodes 40a and 40b provided on an inner surface of the opposing substrate 13, the electrodes 41a and 41b provided on an inner surface of the opposing substrate 14, an alignment film 18 provided on the electrodes 40a and 40b, and an alignment film 19 provided on two inclined surfaces of each prism 17. In addition, polarizers 21 and 22 for causing polarization directions of incident light and emitted light to be identical are provided on outer surfaces of the opposing substrates 13 and 14, respectively. Here, in the present embodiment, the transmission axes of the polarizers 21 and 22 extend in the Y axis direction. In other words, light of components in vibration directions other than the Y axis direction is absorbed.

Each prism 17 is formed in a triangular pole shape having a triangular cross section and a ridge line extending in the Y axis direction, and has two inclined surfaces, namely, an inclined surface 61 on a center side of the opposing substrate 14 and an inclined surface 62 on a lateral side of the opposing substrate 14, and a bottom surface 63.

As understood from FIGS. 1A and 1B, a plurality of the prisms 17 are provided on the electrodes 41a and 41b so as to be aligned in the X axis direction. Cross-sectional shapes of a plurality of the prisms 17 are formed so as to be bilaterally symmetrical in the entire liquid crystal prism element 3. For facilitating the explanation, the region where the prisms 17 are formed is divided into left and right halves in FIGS. 1A and 1B, the left-side region is indicated by R1, and the right-side region adjacent to the region R1 in the X axis direction is indicated by R2. In addition, a plane that passes through the border line (center line) between the regions R1 and R2 and is orthogonal to the display surface of the image display panel 4 is indicated by P1. The cross-sectional shape of the prisms 17 located in the region R1 and the cross-sectional shape of the prisms 17 located in the region R2 are designed so as to be symmetrical to each other about the plane P1 when seen on a plane parallel to an XZ plane, as shown in FIGS. 1A and 1B.

In the present embodiment, the shapes of the prisms 17 are designed such that both the inclined surfaces 61 and 62 of each of prisms 17 provided at least in a portion of the region on the opposing substrate 14 are not orthogonal to the opposing substrate 14. In order to converge light at the position of an eye of the viewer, the emission angle of light emitted from the lateral portion of the liquid crystal prism element 3 is higher than the emission angle of light emitted from the center portion of the liquid crystal prism element 3. Thus, it is preferred that the inclined surfaces 61 and 62 of each of the prisms 17 provided at least at the screen right edge and the screen left edge of the opposing substrate 14 are formed so as to not be orthogonal to the opposing substrate 14. In addition, the emission angle of light emitted from the liquid crystal prism element 3 increases in a continuous manner or in a phased manner from the center portion to the lateral portion along the X axis direction. Thus, it is preferred that the angle formed between the inclined surface 61 and the bottom surface 63 and the angle formed between the inclined surface 62 and the bottom surface 63 change according to a position on the opposing substrate 14 in the X axis direction. It is noted that specific design examples of the inclined surfaces 61 and 62 will be described later.

The electrode 40a is formed in the region R1 of the inner surface of the opposing substrate 13. The electrode 40b is formed in the region R2 of the inner surface of the opposing substrate 13. Similarly, the electrode 41a is formed in the region R1 of the inner surface of the opposing substrate 14, and the electrode 41b is formed in the region R2 of the inner surface of the opposing substrate 14. Furthermore, the alignment films 18 and 19 which are subjected to orientation treatment for controlling the orientation directions of liquid crystal molecules into a desired direction are provided on the surfaces of the prisms 17 and the electrodes 40a and 40b. The alignment films 18 and 19 orient the liquid crystal molecules such that the long axes of the liquid crystal molecules extend in the Y axis direction in a state where no voltage is applied to the electrodes 40a, 40b, 41a, and 41b. It is noted that the alignment films 18 and 19 may be omitted as long as the orientation of the liquid crystal molecules is kept uniform.

As the material of the opposing substrates 13 and 14 and the prisms 17, glass or resin can be used. When resin is used as the material of the prisms 17, the prisms 17 can be formed by, as an example, imprinting a UV-curing resin on a glass substrate. The liquid crystal prism element 3 can be produced by forming a one-dimensional array of the prisms 17 on the opposing substrate 14 on which the electrodes 41a and 41b have been formed, then attaching together the opposing substrate 14 and the opposing substrate 13 on which the electrodes 40a and 40b have been formed, and injecting a liquid crystal between the opposing substrates 13 and 14.

The liquid crystal prism element 3 is an element that can control the magnitude of the deflection angle of transmitted light according to the magnitude of a voltage applied from the outside. The principle will be described briefly. In general, a liquid crystal molecule has an ellipsoidal shape and has different dielectric constants in the longitudinal direction and the lateral direction thereof. Thus, the liquid crystal layer 20 has a birefringence property in which a refractive index is different for each polarization direction of incident light. In addition, when the direction of the orientation (director) of each liquid crystal molecule relatively changes with respect to the polarization direction of light, the refractive index of the liquid crystal layer 20 also changes. Thus, when the orientation of the liquid crystal is changed by an electric field generated by applying a certain voltage, the refractive index for transmitted light changes, and thus a deflection angle which is a refraction angle of the light changes.

In the present embodiment, a case where uniaxial positive type liquid crystal is used as the material forming the liquid crystal layer 20 will be considered. Then, a case where the liquid crystal molecules are oriented in the Y axis direction when no voltage is applied as described above and a case where the liquid crystal molecules are oriented in the Z axis direction when a voltage is applied will be considered.

Since the transmission axes of the polarizers 21 and 22 extend in the Y axis direction, the refractive index of the liquid crystal layer 20 when no voltage is applied is an extraordinary light refractive index, and the refractive index of the liquid crystal layer 20 when a voltage is applied is an ordinary light refractive index.

In general, in the case where light is deflected by an active element such as the liquid crystal prism element 3, it is desirable to use a liquid crystal material having high $\Delta n$ (=refractive index ne for extraordinary light—refractive index no for ordinary light), in order to increase a deflection angle. However, among commercially available materials, the number of liquid crystal materials having high $\Delta n$ is small, and $\Delta n$ is generally about 0.2.

In addition, even when the liquid crystal prism is formed using the same liquid crystal material, design of the orientation direction and a manner of applying an electric field are important items that have a great influence on the element performance, which is the ability of the liquid crystal prism element, such as a deflection angle, electric power, a switching speed.

It is noted that in the liquid crystal prism element 3, the inclination direction of each inclined surface of each prism 17 is different between the right and left sides of the center line of the screen (the plane P1). The liquid crystal prism element 3 has a property in which the efficiency of deflection toward a direction in which emitted light gets close to the inclined surface of each prism 17 (an upper right direction in FIGS. 2A and 2B) is low as compared to that of deflection toward a direction in which emitted light becomes more distant from the inclined surface of each prism 17 (an upper left direction in FIGS. 2A and 2B). Thus, when the inclined surfaces of the prisms 17 are made symmetrical about the plane P1 and are also made to face ahead of the center portion of the screen, the liquid crystal prism element 3 can efficiently deflect light incident near the left edge of the screen, toward ahead of the screen on the light, and can efficiently deflect light incident near the right edge of the screen, toward ahead of the screen on the left. In this case, different voltages are applied to the right and left regions of the liquid crystal prism element 3. Thus, the electrodes 40a and 40b and the electrodes 41a and 41b are separated at the center of the screen. When both electrodes in the same substrate are used as ground terminals, the electrodes may not be separated at the center.

Light transmitted through the liquid crystal prism element 3 is incident on the image display panel 4. One example of the image display panel 4 is an in-plane-switching type panel. However, another type of image display panel can be used as the image display panel 4. Light transmitted through the image display panel 4 has directivity and is converged at the position of an eye of the viewer.

The image display apparatus 1 switches between the light sources 7a and 7b in synchronization with switching between the image for right eye and the image for left eye. In addition, when the switching between the image for right eye and the image for left eye is performed at a frequency equal to or higher than 120 Hz, the user can recognize a stereoscopic image on the basis of the image for right eye and the image for left eye.

The position detection section 38 includes a camera 5 and a viewing position calculation section 39. The camera 5 takes an image of the user in predetermined cycles. The viewing position calculation section 39 analyzes the image taken by the camera 5 and calculates viewing position information representing a viewing position of the user. For image analysis performed by the camera 5, a known algorithm for recognizing the position of a face or a portion (eyes, nose, etc.) of a face can be used. In addition, the viewing position information calculated by the viewing position calculation section 39 preferably represents the positions of the eyes of the user, but may represent the position of the face, the nose, or the like instead of the positions of the eyes.

The control section 6 controls the value of a voltage applied to the liquid crystal prism element 3, on the basis of the viewing position information calculated by the viewing position calculation section 39. More specifically, when the viewing position of the user shifts from a position in front of the screen center to the left edge side as shown in FIG. 1A, the light emitted from each prism 17 is deflected in the right direction as seen from the user, by making the refractive index of the liquid crystal layer 20 lower than the refractive index of each prism 17 in the region R1 and making the refractive index of the liquid crystal layer 20 higher than the refractive index of each prism 17 in the region R2. At that time, the deflection angle in the region R1 and the deflection angle in the region R2 can be adjusted by making the voltage applied to the region R1 higher than a voltage applied when light is not deflected and making the voltage applied to the region R2 lower than the voltage applied when light is not deflected. In contrast, when the viewing position of the user shifts from a position in front of the screen center to the right edge side, the light emitted from each prism 17 is deflected in the left direction as seen from the user, by making the refractive index of the liquid crystal layer 20 higher than the refractive index of each prism 17 in the region R1 and making the refractive index of the liquid crystal layer 20 lower than the refractive index of each prism 17 in the region R2. At that time, the deflection angle in the region R1 and the deflection angle in the region R2 can be adjusted by making the voltage applied to the region R2 lower than the voltage applied when light is not deflected and making the voltage applied to the region R1 higher than the voltage applied when light is not deflected.

It is noted that the deflection angle of the liquid crystal prism element 3 and position information of a converged point of light with respect to an applied voltage can be assumed at the stage of designing, and thus it suffices to previously prepare data that associates an applied voltage with position information and to store the data in a storage unit provided in the image display apparatus 1. In addition, after completion of a product, calibration may be performed to correct the position of a light converged point.

By repeating the above-described deflection control based on the viewing position information in predetermined cycles, it is made possible for the viewer to view a stereoscopic image at an arbitrary location even when the viewer freely moves relative to the image display apparatus 1. Thus, according to the present disclosure, an image display apparatus having a wide view range can be realized. In addition, by converging light at the position of an eye of the viewer, a high-brightness and energy-saving image display apparatus 1 can be realized.

In the present embodiment, the light guide plate is shared by the light sources 7a and 7b. However, a light guide plate for the light source 7a and a light guide plate for the light source 7b may be provided so as to be laminated on each other.

In addition, instead of the control film 10 in which the prisms and the lenticular lens are integrated, a prism sheet and a lenticular lens sheet may be individually provided.

Furthermore, the backlight 2 is not limited to have the configuration shown in FIGS. 1A and 1B, and may have another configuration as long as it can alternately emit right eye light and left eye light in a time division manner in synchronization with switching between right and left image signals.

Furthermore, in the present embodiment, the directions of the inclined surfaces of the prisms 17 in the liquid crystal prism element 3 are made different between the regions R1 and R2, and the inclined surfaces of the prisms 17 are formed so as to be symmetrical about the plane P1. However, the directions of the inclined surfaces of the prisms may be uniform in the entire liquid crystal prism element 3. In this case, instead of providing the separate electrodes in the regions R1 and R2 of the liquid crystal prism element 3 as in the present embodiment, a single electrode is provided over the entire display screen. However, it is more preferred to provide the prisms 17 and the electrodes separately in the two regions R1 and R2, in terms of the deflection angle and transmission efficiency of a light beam with respect to orientation change.

Furthermore, the present embodiment has been described with, as an example, a stereoscopic image display apparatus that displays, in a time division manner, an image for right eye and an image for left eye that have a parallax. However, an image having no parallax may be displayed. In this case, the light sources 7a and 7b are constantly lit up instead of being alternately lit up. In addition to the case of displaying a three-dimensional image, also when a two-dimensional image is displayed, the displayed content can be prevented from being seen by surrounding people and privacy protection can also be improved, by following movement of the viewer and projecting an image only on the eyes of the viewer and the vicinity thereof in a reduced range.

<2. Explanation of Liquid Crystal Prism>

Prior to description of optimum design of the liquid crystal prism element according to the present disclosure, the configuration of a liquid crystal prism element according to a comparative example will be described. As setting conditions in the following description, a vertical distance (h in FIG. 1A) between the viewer and the image display apparatus is set to 300 mm, the width (w in FIG. 1A) of the image display panel 4 is set to 221 mm, the extraordinary light refractive index ne of the liquid crystal material is set to 1.737, the ordinary light refractive index no of the liquid crystal material is set to 1.537 ($\Delta n=0.2$), the refractive index n of each prism is set to 1.6. In addition, in the above conditions, a light beam angle at which a light beam that is emitted from the backlight 2 and directed toward the viewer at a position in front of the screen center is incident on the liquid crystal prism element is 0° at the screen center, and 20.2° at the screen right edge.

Comparative Example

Figure 2B:
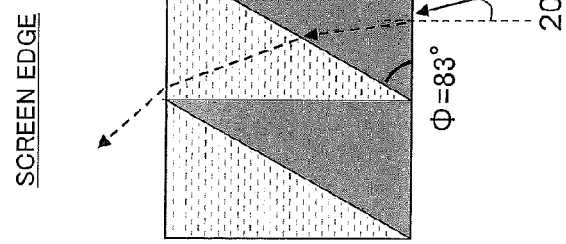
FIGS. 2A and 2B are schematic diagrams illustrating the configuration of a liquid crystal prism element according to a comparative example.
Figure 2A:
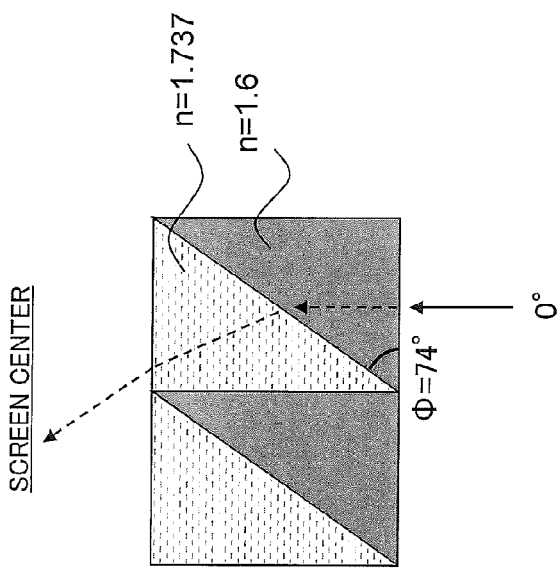

FIGS. 2A and 2B are schematic diagrams illustrating the configuration of the liquid crystal prism element according to the comparative example. More specifically, FIG. 2A shows a cross-sectional shape of a prism located at the screen center, and FIG. 2B shows a cross-sectional shape of a prism located at the screen right edge.

When the viewer is in front of the screen center, a voltage applied to the liquid crystal prism element is controlled such that the refractive index of the liquid crystal becomes 1.6, in order to cause the refractive indexes of the liquid crystal layer and each prism to be the same. When the viewer moves to a position in front of the screen left edge, the voltage applied to the liquid crystal prism element is controlled such that the refractive index of the liquid crystal layer in the right-side region R2 becomes 1.737 and the refractive index of the liquid crystal layer in the left-side region R1 becomes 1.537. On the other hand, when the viewer moves to a position in front of the screen right edge, the voltage applied to the liquid crystal prism element is controlled such that the refractive index of the liquid crystal layer in the right-side region R2 becomes 1.537 and the refractive index of the liquid crystal layer in the left-side region R1 becomes 1.737. The prism angles of the prisms at the center and the right edge of the image display panel are designed such that a light beam can be deflected in the direction toward the viewer by such change of the refractive index of the liquid crystal layer.

When the prism at the screen center deflects incident light toward the viewer located in front of the screen left edge, it is necessary to deflect light incident at an incident angle of 0° relative to the incident surface of the liquid crystal prism element, toward ahead of the screen left edge at an emission angle of 20°. In the state where the viewer is in front of the screen left edge, since the refractive index of the prism is 1.6 and the refractive index of the liquid crystal layer is 1.737, when calculation is performed according to Snell's law, the angle formed between the refractive surface of the prism and the incident surface of the liquid crystal prism element becomes 74° (FIG. 2A). On the other hand, when the prism at the screen right edge deflects incident light to the viewer located in front of the screen left edge, it is necessary to deflect light incident at an incident angle of 20.2° relative to the incident surface of the liquid crystal prism element, toward ahead of the screen left edge at an emission angle of 36°. In the state where the viewer is in front of the screen left edge, since the refractive index of the prism is 1.6 and the refractive index of the liquid crystal layer is 1.737, when calculation is performed according to Snell's law, the angle formed between the refractive surface of the prism and the incident surface of the liquid crystal prism element becomes 83° (FIG. 2B). In this manner, the angles of the prisms in the respective regions are determined. With the configuration described above, a display apparatus capable of scanning a range of ±110.5 mm with respect to the screen center can be realized.

Figures 3A, 3B:
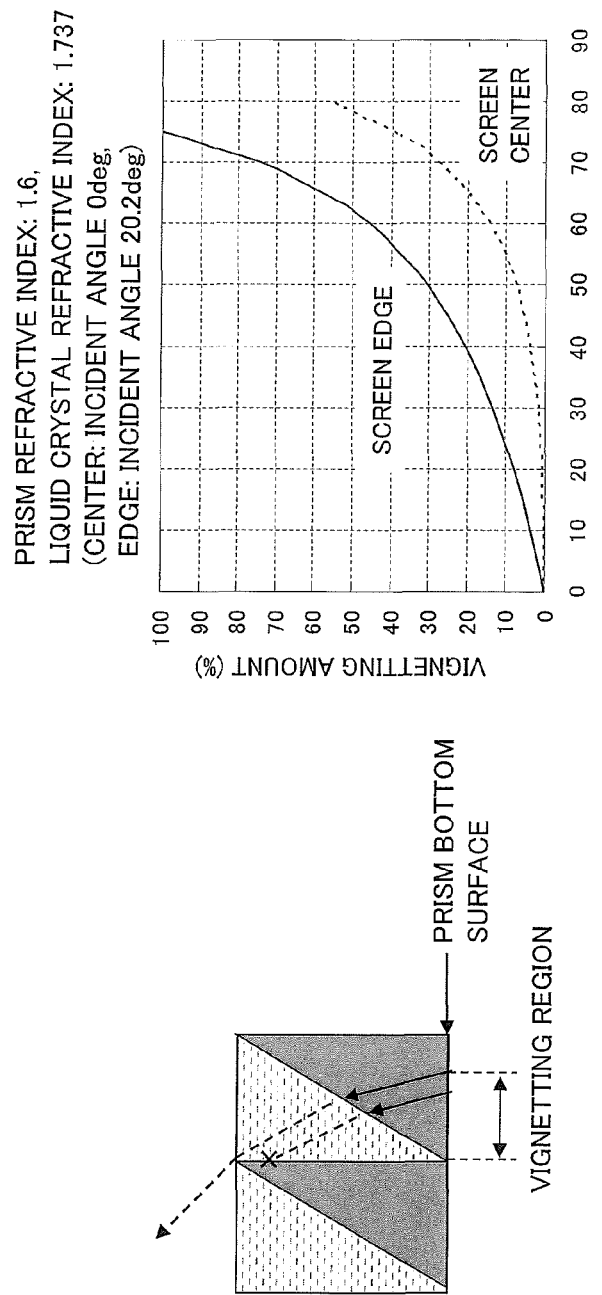
FIGS. 3A and 3B are diagrams explaining vignetting of light in the liquid crystal prism element according to the comparative example.

FIG. 3A is a diagram explaining vignetting of light in the liquid crystal prism element according to the comparative example.

In FIGS. 2A and 2B, only the prisms at the screen center and the screen right edge are shown, but a plurality of prisms are actually arranged in the right-left direction of the screen. A light beam that is transmitted through the prism and incident on the liquid crystal layer is emitted toward the position of the viewer, but a portion of the incident light is incident on the wall surface of the adjacent prism and becomes stray light as shown in FIG. 3A. When the stray light occurs, the amount of transmitted light decreases, and thus the display becomes dark.

A light beam tracking simulation is performed while the position of a light beam incident on the bottom surface of the prism is changed, to calculate a region of the prism where stray light occurs. Then, the ratio of the region where stray light occurs, to the prism region, is defined as a vignetting amount of light.

FIG. 3B is a graph showing a vignetting amount calculated while the angle of each of the prisms at the screen center and the screen right edge is changed. When the angle of the prism (the angle formed between the incident surface of the prism element and the refractive surface) is 0°, no prism is present, and thus the vignetting amount becomes 0%. As the angle of the prism is increased, the vignetting amount increases. At the same prism angle, the vignetting amount in the prism at the screen right edge is higher than the vignetting amount in the prism at the screen center. This is because a change of the light beam angle at the screen center is from 0° to 20°, while a change of the light beam angle at the screen right edge is from 20° to 36°. In other words, as shown in FIG. 3A, on the outer side of the screen center, light is incident on the refractive surface of the prism from an oblique direction and thus is easily shaded by the adjacent prism.

When the angle of the prism at the screen center is set to 74° and the angle of the prism at the screen right edge is set to 83° on the basis of the above calculation result, the vignetting amount at the screen center becomes 33% and the vignetting amount at the screen right edge becomes 100% from the graph in FIG. 3B. In other words, in the prism at the screen right edge, all light becomes stray light, and no deflected light reaches the viewer therefrom.

Example 1

Figure 4:
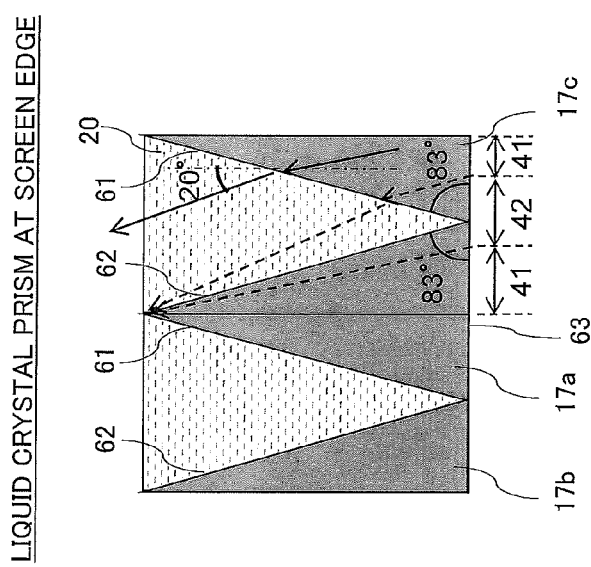
FIG. 4 is a diagram explaining vignetting of light in a liquid crystal prism element according to Example 1.

FIG. 4 is a diagram explaining vignetting of light in a liquid crystal prism element according to Example 1.

In the liquid crystal prism element according to Example 1, a cross-sectional shape of a prism located at the screen center is a right-angled triangle, which is the same as that shown in FIG. 2A. Meanwhile, a prism 17a located at each of the screen right edge portion and left edge portion is formed such that the angle formed between the inclined surface 61 and the bottom surface 63 is substantially equal to the angle formed between the inclined surface 62 and the bottom surface 63. In other words, a cross section of the prism 17a located at each of the screen right edge portion and left edge portion is an isosceles triangle as shown in FIG. 4. When FIG. 4 and FIG. 2B are compared to each other, the angle formed between the inclined surface 61 on the screen center side and the bottom surface 63 is 83° and is the same in both drawings. Meanwhile, the angle formed between the inclined surface 62 on the screen lateral side and the bottom surface 63 is 90° in FIG. 2B but is 83° in FIG. 4.

With such a configuration, a light beam incident on a region 41 shown in FIG. 4 is transmitted through the liquid crystal layer 20 and reaches the viewer without being incident on the inclined surface 62 of the prism 17a or a prism 17b adjacent to the prism 17a. Meanwhile, a light beam incident on a region 42 is incident on the inclined surface 62 of the prism 17b adjacent to the prism 17a or the inclined surface of the prism 17a and becomes stray light. A vignetting amount calculated at that time by the above-described light beam tracking simulation is 50%. In the comparative example, the vignetting amount is 100%. Thus, it is recognized that by the prism design according to Example 1, the vignetting amount at each of the screen right edge and left edge can be improved by 50%.

Example 2

Figure 5:
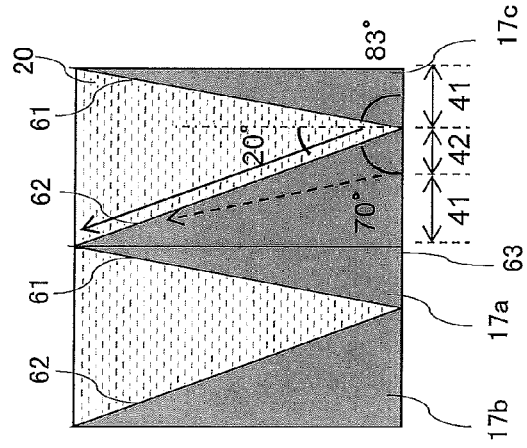
FIG. 5 is a diagram explaining vignetting of light in a liquid crystal prism element according to Example 2.

FIG. 5 is a diagram explaining vignetting of light in a liquid crystal prism element according to Example 2.

In the liquid crystal prism element according to Example 2, a cross-sectional shape of a prism located at the screen center is a right-angled triangle, which is the same as that shown in FIG. 2A. Meanwhile, a prism 17a located at each of the screen right edge portion and left edge portion is formed such that the inclined surface 62 of the prism 17a is substantially parallel to an emission direction in which a light beam is emitted from the inclined surface of a prism 17c adjacent to the prism 17a on the lateral side.

The prism located at the screen right edge will be described in detail. First, the angle of a light beam emitted from the liquid crystal prism at the screen right edge toward the viewer located in front of the screen left edge is represented by the following formula.

$$\arctan\left(\frac{w}{h}\right)$$

Here, h is the distance between the viewer and the display apparatus, and w is the width of the liquid crystal panel.

Therefore, the angle of a light beam within the liquid crystal layer is represented by the following formula.

$$\arcsin\left(\frac{1}{n}\sin\left(\arctan\frac{w}{h}\right)\right)$$

Here,
n is the extraordinary light refractive index of the liquid crystal material.

Therefore, the angle formed between the inclined surface 62 and the bottom surface 63 of the prism at the screen right edge is represented by the following formula.

$$90 - \arcsin\left(\frac{1}{n}\sin\left(\arctan\frac{w}{h}\right)\right)$$

Here, when FIG. 5 and FIG. 2B are compared to each other, the angle formed between the inclined surface 61 on the screen center side and the bottom surface 63 of the prism is 83° and is the same in both drawings. Meanwhile, the angle formed between the inclined surface 62 on the screen lateral side and the bottom surface 63 of the prism is 90° in FIG. 2B but is 70° in FIG. 5. This is because a light beam incident at an angle of 20° relative to a perpendicular to the bottom surface 63 of the prism is refracted according to Snell's law and emitted to the liquid crystal layer at an angle of 20° relative to the perpendicular to the bottom surface 63 of the prism. Therefore, the angle formed between the inclined surface 62 on the screen lateral side and the bottom surface 63 of the prism is set to 70° in order to cause the inclined surface 62 and the light beam emitted to the liquid crystal layer 20 at an angle of 20° to be substantially parallel to each other.

With such a configuration, light beams transmitted through regions 41 are transmitted through the liquid crystal layer 20 and reach the viewer without being incident on the wall surface of the adjacent prism 17b. Meanwhile, a light beam transmitted through the region 42 is incident on the inclined surface of the prism on the screen lateral side without reaching the liquid crystal layer, and becomes stray light. A vignetting amount calculated at that time by the above-described light beam tracking simulation is 30%. In the comparative example, the vignetting amount is 100%. Thus, it is recognized that the vignetting amount can be improved by 70% in the prism of the present embodiment.

The display apparatus according to the present disclosure automatically deflects a light beam to the position of the viewer on the basis of the position information of the viewer. Therefore, according to the present disclosure, a high-brightness, high-efficiency, and high-resolution image display apparatus can be realized. In addition, the present disclosure is widely applicable not only to use of displaying a three-dimensional image but also to use of displaying a two-dimensional image. Furthermore, the present disclosure is applicable to a 3D liquid crystal display apparatus, a privacy display, and the like by a simple configuration.

The embodiment and the examples have been described above as illustrative examples of the technology in the present disclosure. For that, the accompanying drawings and the detailed description have been provided.

Furthermore, since the embodiment described above are intended to illustrate the technology in the present disclosure, various changes, substitutions, additions, omissions, and the like can be made within the scope of the claims and the scope of equivalents thereof.

Furthermore, since the embodiment described above are intended to illustrate the technology in the present disclosure, various changes, substitutions, additions, omissions, and the like can be made within the scope of the claims and the scope of equivalents thereof.

What is claimed is:

1. An image display apparatus comprising:
an image display panel;
a backlight device located on a back surface side of the image display panel;
a liquid crystal prism element located between the image display panel and the backlight device and configured to change a deflection direction of emitted light according to a voltage applied thereto;
a position detection section configured to detect a position of a user; and
a control section configured to control the voltage applied to the liquid crystal prism element, on the basis of information of the position of the user detected by the position detection section, wherein:
the liquid crystal prism element includes a first substrate and a second substrate, a plurality of triangular prisms which have a ridge line extending in a first direction parallel to one side of the image display panel and are arranged between the first substrate and the second substrate so as to be aligned in a second direction orthogonal to the first direction, and a liquid crystal sealed between the first substrate and the second substrate,
each triangular prism has a first inclined surface located on a center side of the first substrate in the second direction, a second inclined surface located on a lateral side of the first substrate in the second direction, and a bottom surface that is parallel to the first substrate,
in at least one of the triangular prisms, both the first inclined surface and the second inclined surface are not perpendicular to the first substrate,
an angle formed between the first inclined surface and the bottom surface increases in a continuous manner or in a stepwise manner, as a distance, in the second direction, between a central portion of the first substrate and the triangular prism increases, and
an angle formed between the second inclined surface and the bottom surface decreases in a continuous manner or in a stepwise manner, as the distance, in the second direction, between the central portion of the first substrate and the triangular prism increases.

2. The image display apparatus according to claim 1, wherein in at least one of the triangular prism, an angle formed between the first inclined surface and the bottom surface is equal to an angle formed between the second inclined surface and the bottom surface.

3. The image display apparatus according to claim 1, wherein in at least one of the triangular prism, an angle formed between the second inclined surface and the bottom surface is set such that the second inclined surface is substantially parallel to an emission direction in which a light beam is emitted from the first inclined surface of an adjacent triangular prism on a lateral side.

4. The image display apparatus according to claim 1, wherein
an image signal for right eye and an image signal for left eye to which a parallax is provided are alternately inputted into the image display panel in a time division manner,
the backlight device includes:
a light guide plate having a pair of side surfaces and configured to guide light incident on the side surfaces, to an exit surface;
a first light source located so as to face one of the side surfaces and configured to emit illumination light for displaying an image for right eye;

a second light source located so as to face the other of the side surfaces and configured to emit illumination light for displaying an image for left eye; and a light control sheet configured to deflect the light emitted from the first light source and the second light source toward ahead of a center of the image display panel, and the first light source and the second light source alternately light up in synchronization with switching between the image signal for right eye and the image signal for left eye.

5. The image display apparatus according to claim 1, wherein the at least one of the triangular prisms is located at a lateral side of the first substrate in the second direction.

* * * * *